United States Patent
Cortez et al.

(10) Patent No.: US 9,042,727 B2
(45) Date of Patent: May 26, 2015

(54) LAYER 1 FAST PROVISIONING AND RIGHT SIZING OF BANDWIDTH FOR LAYER 2/3

(75) Inventors: Bruce Cortez, Freehold, NJ (US); Martin Birk, Holmdel, NJ (US); Paul Greendyk, Pompton Plain, NJ (US); James H. King, Red Bank, NJ (US); Sherry L. McCaughan, Quinton, VA (US); Aswatnarayan Raghuram, Morganville, NJ (US); Kathleen A. Tse, Holmdel, NJ (US); Philip Henry Wisseman, Austin, TX (US); Simon Zelingher, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 864 days.

(21) Appl. No.: 13/252,269

(22) Filed: Oct. 4, 2011

(65) Prior Publication Data

US 2013/0084066 A1    Apr. 4, 2013

(51) Int. Cl.
| | |
|---|---|
| *H04J 14/00* | (2006.01) |
| *H04J 3/16* | (2006.01) |
| *H04L 12/701* | (2013.01) |
| *H04J 14/02* | (2006.01) |
| *H04L 12/24* | (2006.01) |

(52) U.S. Cl.
CPC .............. *H04J 3/1652* (2013.01); *H04L 45/00* (2013.01); *H04J 3/1682* (2013.01); *H04J 14/0257* (2013.01); *H04L 41/0896* (2013.01); *H04J 2203/0085* (2013.01); *H04J 2203/0094* (2013.01); *H04J 14/0212* (2013.01); *H04J 14/0273* (2013.01)

(58) Field of Classification Search
CPC ............ H04L 2012/5632; H04L 47/12; H04L 47/125; H04L 47/726; H04L 45/00; H04L 47/10
USPC .......................... 398/45, 51, 57; 370/228, 237
See application file for complete search history.

(56) References Cited

U.S. PATENT DOCUMENTS

| | | | | |
|---|---|---|---|---|
| 5,848,055 | A * | 12/1998 | Fedyk et al. .................. | 370/228 |
| 6,925,054 | B1 * | 8/2005 | Atterton et al. ............... | 370/218 |
| 7,310,478 | B1 * | 12/2007 | Norman et al. ................... | 398/5 |
| 8,285,141 | B1 * | 10/2012 | Crowe et al. .................... | 398/45 |
| 2002/0191250 | A1 * | 12/2002 | Graves et al. ................. | 359/128 |
| 2005/0122969 | A1 * | 6/2005 | Nigam et al. ................. | 370/386 |
| 2011/0085803 | A1 * | 4/2011 | Ji et al. ............................ | 398/79 |

OTHER PUBLICATIONS

ODU and ODUflex A Future-Proof Solution for OTN Client Mapping (TPAC A/S Feb. 2010) (www.tpack.com).

* cited by examiner

*Primary Examiner* — David Payne
*Assistant Examiner* — Tanya Motsinger

(57) ABSTRACT

Additional bandwidth is provisioned to layer 2/3 networks by initially provisioning optical wavelength channels to meet incremental needs for additional capacity. When bandwidth requirements grow large enough, a wavelength-sized channel is provisioned to meet the bandwidth needs, and the previously provisioned optical wavelength channels are freed up to be reused for additional growth. The optical wavelength channels may be channelized VLANs mapped to resizable optical channel data units such as ODUflex units.

18 Claims, 5 Drawing Sheets

LAYER 1 FAST PROVISIONING AND RIGHT SIZING OF BANDWIDTH FOR LAYER 2/3

FIELD OF THE DISCLOSURE

The present disclosure relates generally to providing network data service, and more particularly, to provisioning additional bandwidth to layer 2/3 devices in an optical data network.

BACKGROUND

Providing additional bandwidth to layer 2/3 networks is often a slow process, involving building wavelengths directly over one or more dense wavelength division multiplexing (DWDM) systems. Improvements in the speed of wavelength delivery have been implemented, but those improvements have been limited by the non-flexible characteristics of the DWDM equipment. Because the final destination of additional bandwidth is not known until the need arises, it is not possible to deploy the required hardware and cabling until the actual provisioning time. That limitation can cause delays and expenses in meeting increased bandwidth demands.

Because of those limitations in adding bandwidth on demand, more bandwidth is often initially provisioned than is actually needed. That leads to extra capital cost, extra operations cost, and customer impact because of the inability of network providers to respond to short term spikes in demand.

SUMMARY OF THE DISCLOSURE

In accordance with one aspect of the present disclosure, a method is provided for provisioning bandwidth in an optical data network. The method generally comprises allocating, by a processor, at least one channelized connection to carry a first incremental bandwidth between a first layer 2/3 device and a second layer 2/3 device through an optical switching device connected to the first layer 2/3 device; determining, by the processor, an additional required bandwidth between the first layer 2/3 device and the second layer 2/3 device, wherein a total required bandwidth, including the first incremental bandwidth and the additional required bandwidth, exceeds a threshold bandwidth; and allocating, by the processor, a wavelength-sized channel to carry the total required bandwidth between the first layer 2/3 device and the second layer 2/3 device, bypassing the optical switching device.

In accordance with another aspect of the present disclosure, a tangible computer-usable medium includes computer readable instructions stored thereon for execution by one or more processors to perform one or more of the above methods.

These aspects of the disclosure and further advantages thereof will become apparent to those skilled in the art as the present disclosure is described with particular reference to the accompanying drawings.

DETAILED DESCRIPTION

Figure 1:
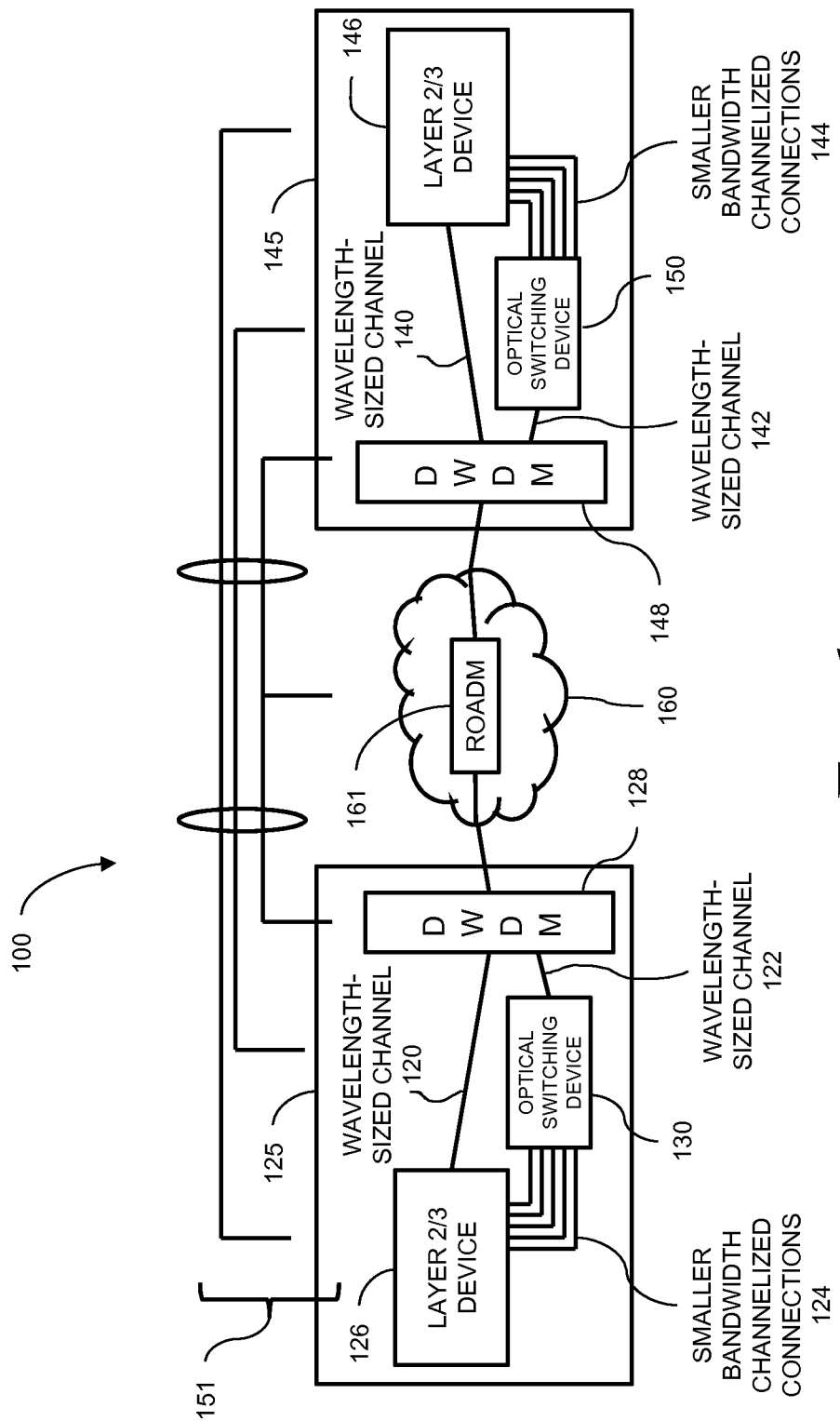
FIG. 1 is a schematic view of an optical data network in accordance with one embodiment of the invention.

The presently described solution is based on the flexibility of new layer 1 equipment in supporting bandwidth including wavelengths. For example, the optical transport network (OTN) switching function allows flexible connections of OC48/192/768/10GE/40GE (or any defined increment of bandwidth) between drop ports across the network. The control plane sets up these connections on demand. Synchronous Optical Networking (SONET) networks are also capable of the flexible connection of devices across a network. Flexible DWDM function has a similar capability, being able to connect from any drop port to any other drop port using "colorless and directionless" reconfigurable optical add-drop multiplexer (ROADM) capability, along with pools of regenerators that are tied together with a control plane to be able to set up the connection. A colorless and directionless feature of ROADM is the ability of tunable transponders at a local add/drop port to have non-blocking access to all DWDM network ports.

The presently disclosed systems and methods use this new equipment to quickly set up optical wavelength channels to carry incremental required bandwidth between devices providing layer 2/3 switching functionality. The equipment is able to size the wavelengths to the appropriate bandwidth needs at that point in time. That leads to capital savings, operations savings, and improved customer performance because of the ability to respond to short term spikes in demand.

Embodiments of the disclosure will be described with reference to the accompanying drawing figures wherein like numbers represent like elements throughout. It is to be understood that the disclosure is not to be limited in its application to the details of the examples set forth in the following description and/or illustrated in the figures. The disclosure is capable of other embodiments and of being practiced or carried out in a variety of applications. Also, it is to be understood that the phraseology and terminology used herein is for the purpose of description and should not be regarded as limiting. The use of "including," "comprising," or "having" and variations thereof is meant to encompass the items listed thereafter and equivalents thereof as well as additional items.

As used herein, the term "collocated" means located in a common network facility, such as a central office. For example, multiple functionalities that are integrated in a single device or group of devices are "collocated."

A "layer 2/3 device," as used herein, is a device providing functionality in one or both of the data link layer and the network layer of the OSI model (layer 2 and layer 3, respectively). Examples of such a device include, but are not limited to, a layer 2/3 router or switch. The functionality may alternatively be incorporated in another device such as a general purpose computer. A layer 2/3 device may, for example, perform switching functions by utilizing MAC addresses, IP addresses or other destination identifiers to pass information packets from one port to another.

An "optical switching device," as used herein, is a device that provides opto-electronic switching functionality; i.e., provides electronic switching between fiber transponders, as opposed to photonic switching by physically switching light. Examples of such a device include an OTN switch and a SONET switch. An optical switching device may include an integral processor or a general purpose computer programmed to perform optical switching functions such as electronically controlling optical signal paths in an optical network.

The new layer 1 technologies, including OTN switches and coherent DWDM, both managed via control planes, permit new network architectures and capabilities. Specifically, the present disclosure addresses the problem of providing bandwidth on demand for Layer 2/3 packet networks. The term "bandwidth," as used herein, is the capacity to transport data between two points at a given bit rate. Bandwidth is expressed in the same units used in expressing bit rate, such as gigabits per second (Gbps). The disclosed system and method allow fast provisioning of bandwidth and right sizing of the bandwidth to maintain high network utilization and therefore capital savings. "Provisioning" bandwidth or "allocating" bandwidth, as used herein, means reserving network resources so that a certain bandwidth is available between two points in the network.

Use of Two Bandwidth Levels

An optical data network 100, shown in FIG. 1, implements one embodiment of the invention. The network 100 includes a DWDM optical network 160 connecting two locations 125, 145. The DWDM optical network 160 preferably includes ROADMs, such as ROADM 161, that perform photonic switching functions. The first location 125 includes a layer 2/3 device 126 connected directly to a DWDM 128 by a wavelength-sized channel 120. The first location 125 may, for example, be a central office of the optical data network. The layer 2/3 device 126 is also connected to an optical switching device 130 by smaller-bandwidth channelized connections 124. The layer 2/3 device 126 and the optical switching device 130 are collocated at the first location. The optical switching device 130 is connected to the DWDM 128 by at least one wavelength-sized channel 122.

The second location 145, which may also be a central office, includes a layer 2/3 device 146 connected directly to a DWDM 148 by a wavelength-sized channel 140. The layer 2/3 device 146 is also connected to an optical switching device 150 by smaller-bandwidth channelized connections 144. The layer 2/3 device 146 and the optical switching device 150 are collocated at the second location. The optical switching device 150 is connected to the DWDM 148 by at least one wavelength-sized channel 142.

Two levels of bandwidth are used in implementing the disclosed network 100. One or more large bandwidth connections, such as a 100 Gbps wavelength-sized channel 120, extend directly from the layer 2/3 equipment 126 to the DWDM 128. Each wavelength-sized channel 120 carries signals with a common destination address. A plurality of smaller bandwidth connections, such as the 10 Gbps optical channelized connections 124, connect the Layer 2/3 device 126 to the collocated optical switching device 130. The 10 Gbps optical channelized connections 124 occur in pools of cross-office capacity that are equipped but not connected to any specific far-end destination. The optical switching device 130 aggregates those smaller bandwidth channelized connections 124 having common destination addresses into single wavelength-sized channels 122.

The control plane 151 manages the layer 2/3 devices, the optical switching devices and the DWDMs together to perform the methods described herein.

Figure 2:
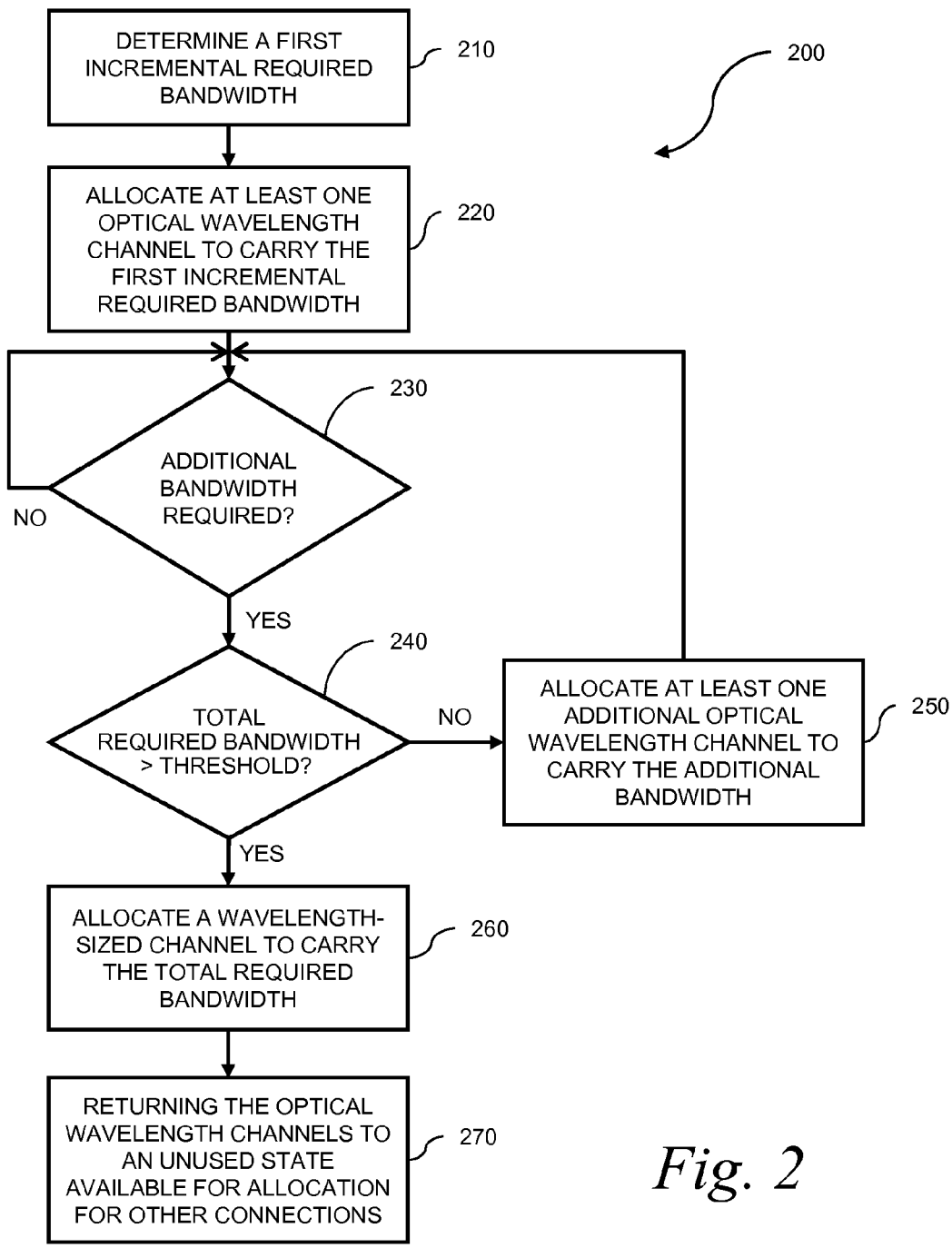
FIG. 2 is a flowchart showing a method in accordance with one embodiment of the invention.

An example method in accordance with this embodiment will now be described with reference to FIGS. 1 & 2. The system initially determines, at block 210, that a first incremental bandwidth is required. That determination is made, for example, at the originating layer 2/3 device.

At the time that the determination is made that bandwidth is needed, the connection across either the DWDM 128 or optical switching device 130 (FIG. 1) to the far-end destination 146 is made by the control plane 151. The system initially meets incremental bandwidth demands, at block 220, with one or more standard-rate optical wavelength channels. For example, connections capable of carrying 1 Gbps, 10 Gbps and 40 Gbps, together with multiples and combinations of those rates, may be used in connecting the layer 2/3 router 126 and the optical switching device 130. Those smaller bandwidth channelized connections 124 are aggregated by the optical switching device 130 into 100 Gbps wavelength-sized channels 122 linking the optical switching device with the DWDM 128. Additional smaller bandwidth channelized connections (not shown) from other layer 2/3 devices may also be aggregated with the connections 124 by the optical switching device 130.

As additional capacity is needed (decision 230), if that capacity is below a threshold bandwidth (decision 240), then additional units of smaller bandwidth (e.g., 10 Gbps) are added by adding more 10 Gbps channelized connections, at block 250. The threshold bandwidth may be approximately the size of a wavelength-sized channel. For example, the threshold may be approximately 100 Gbps, and may be reduced from that number to provide a margin of safety. The threshold may be dynamically adjusted to account for network conditions. When the bandwidth needs grow large enough, and the total required bandwidth exceeds the threshold, then a unit of large bandwidth (e.g., 100 Gbps wavelength-sized channel) is created to the same destination at block 260, and the units of smaller bandwidth (i.e., the 10 Gbps channelized connections) are freed up to be reused for additional growth to the same location destination or for growth to other locations, at block 270.

The above technique may be implemented in a range of optical data network types, including SONET networks and OTN networks.

Channelizing into Flexible Units of Bandwidth

Another application of the presently described concept uses additional capabilities of the new layer 1 technologies. This embodiment is described with reference to the system 300 of FIG. 3, in which elements corresponding to elements of FIG. 1 are numbered using element numbers incremented by 200 over those of FIG. 1.

In the layer 2/3 device 326, a port 327 may be virtually channelized into virtual local area networks (VLANs) 327 or other equivalent packet tagging functionality. In the layer 2/3 device 346 in the far end location 345, a port 347 may also be virtually channelized.

In the case where the optical switching device 330 is an OTN switch, capacity is channelized into optical channel data units (ODUs), the digital path layer for the OTN. Recent work has permitted the flexible resizing of ODU containers to accommodate various client rates. One such resizable ODU, described in Recommendation ITU-T G.709/Y.1331 (December 2009), is ODUflex, a flexible unit with a capacity of n×1.25 Gbps. The flexible lower order ODUflex container can be "right sized" to fit any client rate and thus occupies the minimum number of time slots in the higher order ODU information structures.

In the case where the optical switching device is a SONET switch, the SONET switch maps gigabit Ethernet signals into SONET bandwidth at flexible rates (n×50 Mbps) using the virtual concatenation (VCAT) network standard protocol. The signals may then be resized using the link capacity adjustment scheme (LCAS) to dynamically increase the bandwidth of the virtually concatenated containers.

Figure 3:
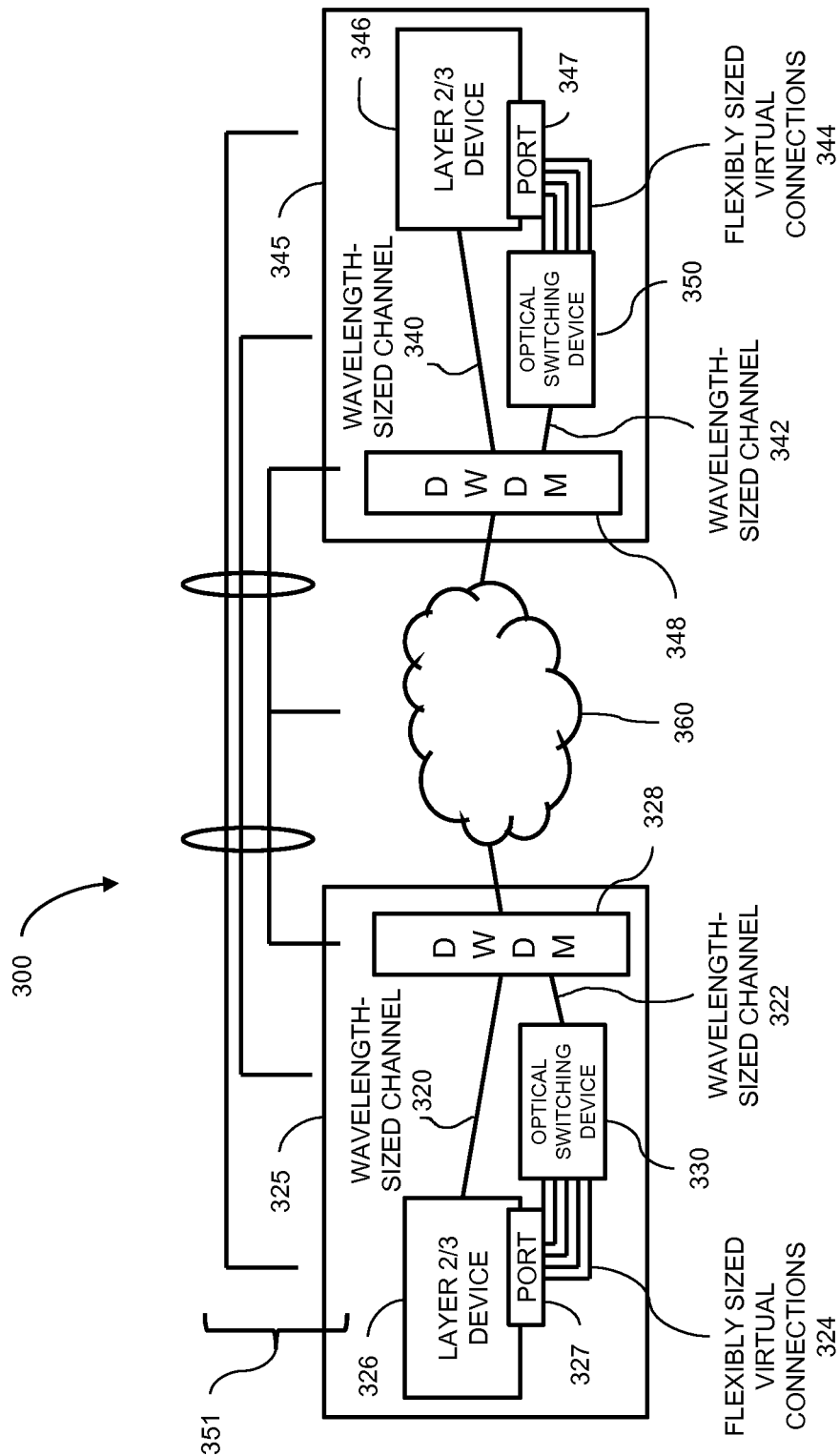
FIG. 3 is a schematic view of an optical data network in accordance with another embodiment of the invention.
Figure 4:
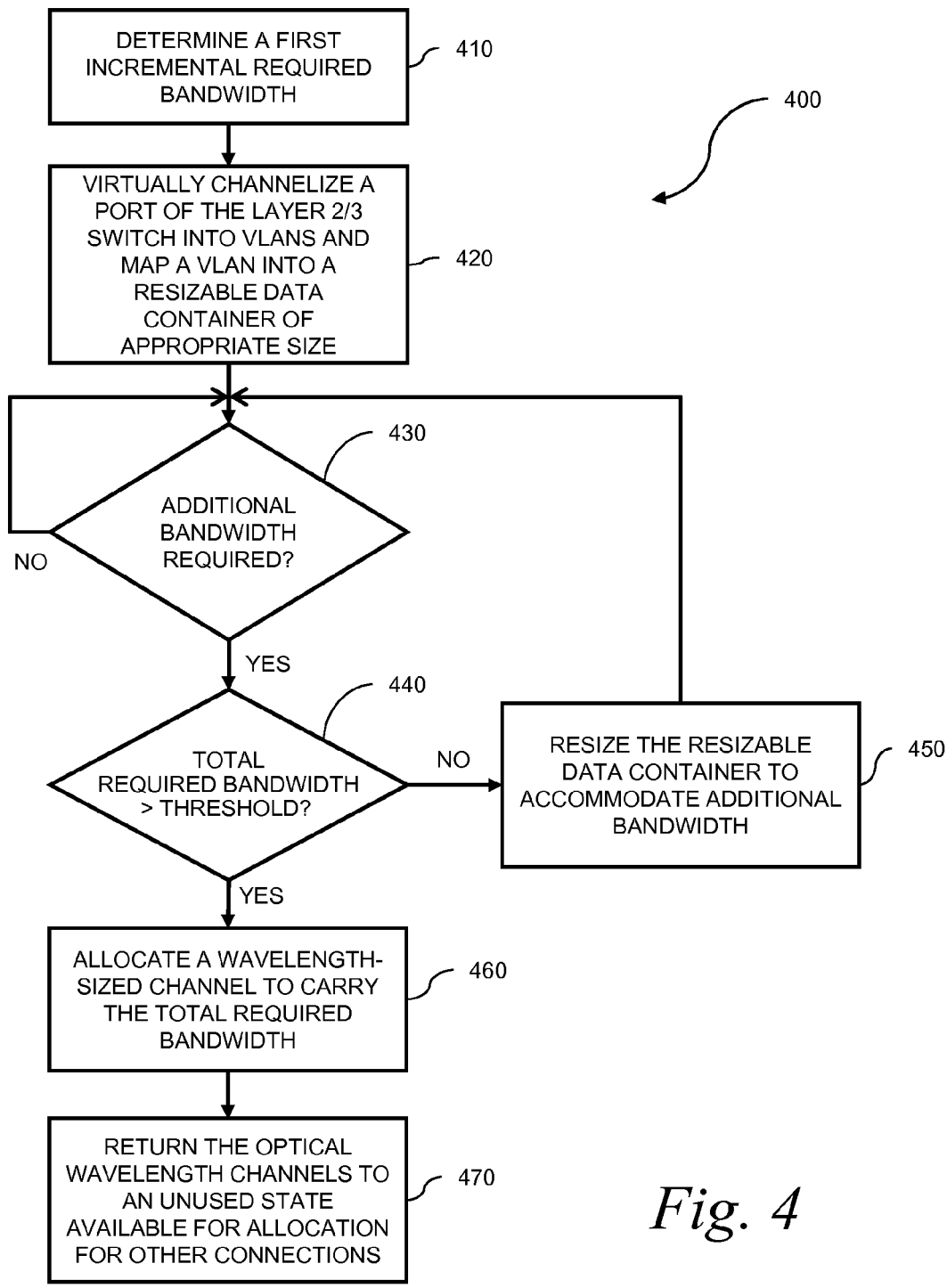
FIG. 4 is a flowchart showing a method in accordance with another embodiment of the invention.

As shown in FIGS. 3 and 4, when a determination is made that bandwidth is required (block 410), the optical switching device maps individual VLANs from inside a port into an ODUflex or similar resizable ODU or LCAS container of the appropriate size relative to the VLAN, at block 420. Using this concept, the network still has the direct high bandwidth connections as above from the Layer 2/3 device to the DWDM, but would also have high bandwidth connections from the Layer 2/3 device to the optical switching device. The latter connections are channelized via VLAN or equivalent, and the optical switching device can map this to resizable containers.

In the operation of this network, the control plane 351 manages the Layer 2/3 device, the optical switching device and the DWDM, using a User Network Interface (UNI) protocol or equivalent. The Layer 2/3 device determines the need for bandwidth to a far end, and sends a request to the OTN (or other optical) network. The Layer 2/3 network places the traffic onto a via on the specific port and the optical network maps this to a VLAN and connects to the far-end device.

If the Layer 2/3 device 326 determines that more capacity is needed (decision 430), it can resize the VLAN at block 450, and inform the optical switching device. The optical switching device can resize the ODUflex or similar container. If it is not possible to resize the resizable container on the same port, a different port is created with a VLAN to the same destination, and an additional resizable container is created to the same destination.

The connections are preferably resized in a manner resulting in no packet loss. The connections may be resized in a hitless or in a non-hitless manner. As used herein, resizing a connection in a hitless manner means resizing the containers in a connection without loss of data and without the use of a temporary alternative path. Hitless resizing of the ODUflex is being discussed in standards bodies but is not yet described in a standard. Non-hitless techniques are also available. In one example, the control plane signals the two layer 2/3 devices, the layer 2/3 devices take the traffic off the circuit for a short time, possibly placing it on an alternative path, the optical network resizes the circuit and then the layer 2/3 devices bring the traffic back.

As described above in connection with the use of two bandwidth levels, once the resizable container circuits are large enough, or a size threshold it reached (decision 440), a full large-bandwidth connection to DWDM is created at block 460, and the resizable container connections are resized smaller or eliminated at block 470, and the capacity is reused for new growth or for growth to other destinations.

Implementation

Figure 5:
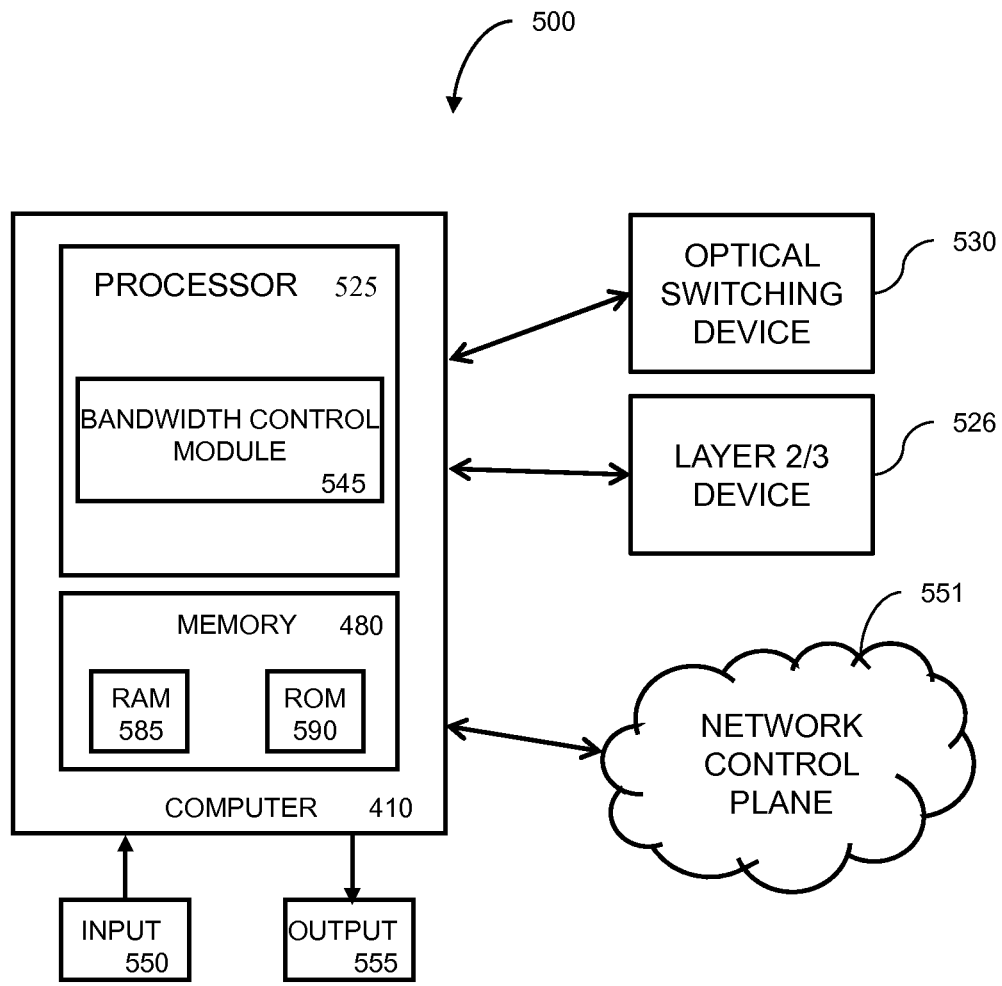
FIG. 5 is a schematic diagram of a computer system used in implementing methods in accordance with the present invention.

A computer system 500 for provisioning and right-sizing bandwidth, according to an exemplary embodiment of the present invention, is illustrated in FIG. 5. In the system 500, a computer 510 performs elements of the disclosed method. While the computer 510 is shown as a single unit, one skilled in the art will recognize that the disclosed steps may be performed by a computer comprising a plurality of units linked by a network or a bus. Specifically, the computer 510 may be a stand-alone unit communicating with a network control plane 551, one of more optical switching devices 530, and one or more layer 2/3 devices 526. Alternatively, the computer 510 may be fully integrated with any one of those devices, or may be instantiated as a combination of processing capabilities residing in several of those devices or one or more additional devices.

The computer 510 may receive data from any number of data sources that may be connected to the computer, including network control plane 551, optical switching device 530 and layer 2/3 device 526.

The computer 510 includes a processor 525 and a memory 580. The computer 510 may be connected to an input device 550 and an output device 555. The input 550 may be a mouse, network interface, touch screen, etc., and the output 555 may be a liquid crystal display (LCD), cathode ray tube (CRT) display, printer, etc. The computer 525 may be connected to a network, with all commands, input/output and data being passed via the network. The computer 525 can be configured to operate and display information by using, e.g., the input 550 and output 555 devices to execute certain tasks.

The processor 525 includes one or more bandwidth control modules 545 that are configured for performing one or more methods for controlling bandwidth as discussed herein.

The memory 580 includes a random access memory (RAM) 585 and a read-only memory (ROM) 590. The memory 580 may also include removable media such as a disk drive, tape drive, memory card, etc., or a combination thereof. The RAM 585 functions as a data memory that stores data used during execution of programs in the processor 525 and is used as a work area. The ROM 590 functions as a program memory for storing a program executed in the processor 525. The program may reside on the ROM 590 or on any other tangible or non-volatile computer-usable medium as computer readable instructions stored thereon for execution by the processor 525 or another processor to perform the methods of the invention. The ROM 590 may also contain data for use by other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are transitory and not tangible. Cached information is considered to be stored on a computer-readable medium. Common expedients of computer-readable media are well-known in the art and need not be described in detail here.

CONCLUSION

The ability of the presently described system and method to respond to short term spikes in demand results in operations savings and improved customer performance. Capital savings can be realized by building the right amount of bandwidth at the right time, leading to higher utilization of the network. The presently described system and method furthermore allow layer 2/3 networks to more efficiently support bandwidth-on-demand services such as cloud computing.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for provisioning bandwidth in an optical data network, comprising:
   allocating, by a processor, at least one channelized connection to carry a first incremental bandwidth between a first layer 2/3 device and a second layer 2/3 device through an optical switching device connected to the first layer 2/3 device;
   determining, by the processor, an additional required bandwidth between the first layer 2/3 device and the second layer 2/3 device, wherein a total required bandwidth, including the first incremental bandwidth and the additional required bandwidth, exceeds a threshold bandwidth;
   allocating, by the processor, a direct channel to carry the total required bandwidth between the first layer 2/3 device and the second layer 2/3 device, bypassing the optical switching device;
   wherein allocating at least one channelized connection to carry the first incremental bandwidth, further comprises:
      mapping a physical port between the first layer 2/3 device and the optical switching device to a plurality of virtual local area networks;
      sizing a resizable optical channel data unit to accommodate the first incremental required bandwidth; and
      mapping the resizable optical channel data unit to one of the virtual local area networks.

2. The method of claim 1, further comprising:
   after allocating the direct channel, returning at least one channelized connection to an unused state available for allocation for other connections from the first layer 2/3 device.

3. The method of claim 1, further comprising:
   after allocating the at least one channelized connection to carry the first incremental bandwidth between a first layer 2/3 device and a second layer 2/3 device through an optical switching device connected to the first layer 2/3 device, determining a requirement for a second incremental bandwidth between the first layer 2/3 device and the second layer 2/3 device, wherein a total required bandwidth, including the first incremental bandwidth and the second incremental bandwidth, does not exceed the threshold bandwidth;
   allocating at least one additional channelized connection to carry the second incremental required bandwidth between the first layer 2/3 device and the second layer 2/3 device through the optical switching device connected to the first layer 2/3 device.

4. The method of claim 1, wherein the allocated direct channel utilizes dense wavelength division multiplexing.

5. The method of claim 4, wherein the optical data network utilizes colorless and directionless reconfigurable optical add-drop multiplexing.

6. The method of claim 1, wherein the optical switching device comprises a SONET switch.

7. The method of claim 1, wherein the optical switching device comprises an optical transport network switch.

8. The method of claim 1, wherein the optical data network includes a control plane managing the first and second layer 2/3 devices and the optical switching device.

9. The method of claim 1, further comprising:
   determining, by the processor, a required second incremental bandwidth between the first layer 2/3 device and the second layer 2/3 device, wherein a total required bandwidth, including the first and second incremental bandwidths, does not exceed the threshold bandwidth;
   resizing the resizable optical channel data unit to accommodate the first and second incremental bandwidths.

10. The method of claim 1, wherein the resizable optical channel data unit is an ODUflex unit.

11. A tangible computer-useable medium having computer readable instructions stored thereon for execution by one or more processors to perform a method for provisioning bandwidth in an optical data network, the method comprising:
   allocating at least one channelized connection to carry a first incremental bandwidth between a first layer 2/3 device and a second layer 2/3 device through an optical switching device connected to the first layer 2/3 device;
   determining an additional required bandwidth between the first layer 2/3 device and the second layer 2/3 device, wherein a total required bandwidth, including the first incremental bandwidth and the additional required bandwidth, exceeds a threshold bandwidth;
   allocating a direct channel to carry the total required bandwidth between the first layer 2/3 device and the second layer 2/3 device, bypassing the optical switching device;
   wherein allocating at least one channelized connection to carry the first incremental bandwidth, further comprises:
      mapping a physical port between the first layer 2/3 device and the optical switching device to a plurality of virtual local area networks;
      sizing a resizable optical channel data unit to accommodate the first incremental required bandwidth; and
      mapping the resizable optical channel data unit to one of the virtual local area networks.

12. The tangible, computer readable medium of claim 11, wherein the method further comprises:
   after allocating the direct channel, returning at least one channelized connection to an unused state available for allocation for other connections from the first layer 2/3 device.

13. The tangible, computer readable medium of claim 11, wherein the method further comprises:
   after allocating the at least one channelized connection to carry the first incremental bandwidth between a first layer 2/3 device and a second layer 2/3 device through an optical switching device connected to the first layer 2/3 device, determining a requirement for a second incremental bandwidth between the first layer 2/3 device and the second layer 2/3 device, wherein a total required bandwidth, including the first incremental bandwidth and the second incremental bandwidth, does not exceed the threshold bandwidth;
   allocating at least one additional channelized connection to carry the second incremental required bandwidth between the first layer 2/3 device and the second layer 2/3 device through the optical switching device connected to the first layer 2/3 device.

14. The tangible, computer readable medium of claim 11, wherein the optical switching device comprises a SONET switch.

15. The tangible, computer readable medium of claim 11, wherein the optical switching device comprises an optical transport network switch.

16. The tangible, computer readable medium of claim 11, wherein the optical data network includes a control plane managing the first and second layer 2/3 devices and the optical switching device.

17. The tangible, computer readable medium of claim 11, wherein the method further comprises:
   determining, by the processor, a required second incremental bandwidth between the first layer 2/3 device and the second layer 2/3 device, wherein a total required bandwidth, including the first and second incremental bandwidths, does not exceed the threshold bandwidth;
   resizing the resizable optical channel data unit to accommodate the first and second incremental bandwidths.

18. The tangible, computer readable medium of claim 11, wherein the resizable optical channel data unit is an ODUflex unit.

\* \* \* \* \*